3,101,244
METHOD FOR MOLDING ARTICLES

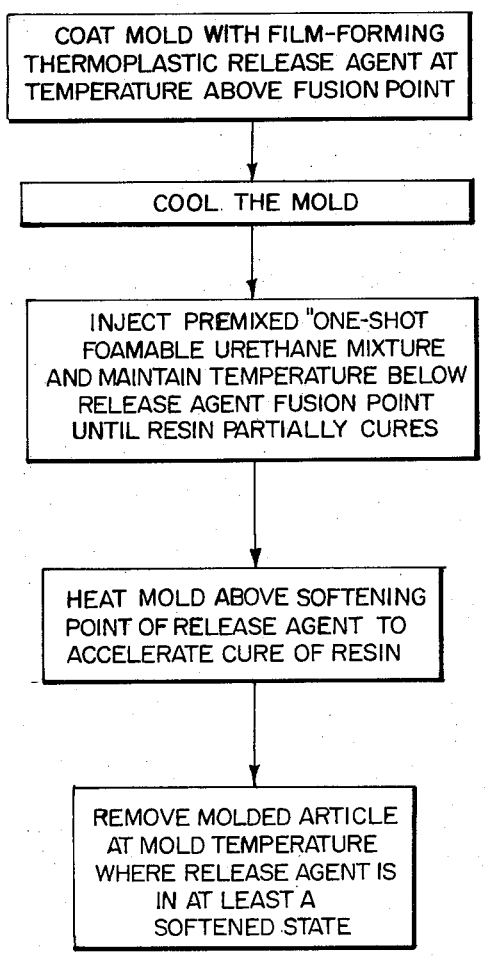

Bruce Gardner Hood and Ralph S. Hood, Marblehead, Mass., and Robert A. Gardella, Dover, N.H., assignors, by direct and mesne assignments, to Davidson Rubber Company, Inc., Dover, N.H., a corporation of New Hampshire
Filed Oct. 21, 1960, Ser. No. 63,965
4 Claims. (Cl. 18—48)

This invention relates to molding articles, and more particularly to release problems encountered in molding articles from thermosetting resins such as polyurethane which are extremely active during the initial phases of the cure.

The mold release problem encountered in the use of polyurethane foams is not serious where pre-polymers are used. This is because the resinous materials pass through their extremely active phase in the pre-polymer stage and when they are molded thereafter conventional release measures are sufficient. On the other hand, where "one shot" urethane foam is employed; i.e. carrying out the entire polymerization while in direct contact with the mold, the resin is so extremely active that it either penetrates through conventional release agents and sticks to the mold, or sticks to the release agent and gradually builds up in the mold during repeated molding operations. The absence of an adequate solution of the release problem hitherto has been one of the major reasons why "one shot" urethane molding is not more widely employed commercially. Accordingly it is a principal object of our invention to provide a method for providing a suitable mold release technique for "one shot" molding highly active thermosetting materials such as polyurethane foam.

In the accomplishment of this object in a preferred embodiment of our invention, we make use of the fact that the polyurethane resin materials have a relatively broad curing temperature range. In the selection of the release agent, we choose a thermoplastic film forming material, such as a wax polyethylene or similar material which forms a relatively hard impervious film and which is solid at a temperature corresponding to the lower portion of the curing temperature range for the resin, but which fuses or is relatively fusible at temperatures in the upper portion of the range of curing temperatures of the said resin. In preparing the mold, we first elevate the temperature of the mold to the melting point of the thermoplastic release material and apply an impervious film of it to the inner surface of the mold. Next we lower the temperature of the mold to a point within the lower portion of the resin curing temperature range and introduce the resin into the mold. Thereafter and for the initial portion of the cure, we maintain the mold substantially at the said lower temperature or at least below the melting point of the release material, and we only permit it to rise to the higher temperature after the resin has cured sufficiently to have passed through its extremely active stage. Finally, the temperature is elevated to the final curing temperature for the resin. This temperature concurrently brings the release material to its fusion point so that, when the cure is sufficiently complete, the release material is either molten or relatively weak and permits ready removal of the molded article from the mold. Thereafter a new film of the mold release material is applied to the mold.

The preferred embodiment of our invention herein described is particularly useful in the production of "one shot" polyurethane foam. An illustrative example of such materials employed with success in our process includes the following ingredients in substantially the following parts by weight:

(1) 50 parts of a polyether glycol sold by Wyandotte Chemicals Corporation, Wyandotte, Michigan, under the trademark Pluracol TP 2540.

(2) 50 parts of a polyether glycol sold by Wyandotte Chemicals Corporation under the trademark Pluracol P 1010.

(3) Approximately 5 parts Freon 11 sold by E. I. du Pont de Nemours & Company, Wilmington, Delaware.

(4) 42–44 parts toluene diisocyanate (80–20 isomer).

(5) 2.8 parts water.

(6) .2 part stannous octoate.

(7) 0.2 part of a triethylenediamine sold by Houdry Process Corporation, Philadelphia, Pennsylvania, under the name Dabco.

(8) 2–4 parts of a N-lauryl morpholine sold by the American Alcolac Corporation, Baltimore, Maryland.

(9) 1–1.5 parts of a silicone sold by Union Carbide Corporation, New York City, under the trademark X520 or L–520.

The above ingredients when mixed together rapidly react to produce an excellent low density "one shot" polyurethane foam. Certain of the ingredients can be adjusted in accordance with known practice to meet varying conditions and produce desired effects. For instance, the Freon ingredient is particularly subject to choice and increasing it tends to reduce the effect of the exothermic heat generated during the reaction and lowers the density of the product. The hardness of the product may be increased by using a higher percentage of Pluracol TP 2540. In addition, other catalysts may be used, such as dibutyl tin diacetate sold by Metal & Thermit Corporation—Chemical Division, New York City. The preferred amount of silicone varies from batch to batch.

While we have disclosed a "one shot" polyurethane foam in the preferred embodiment hereof, it will be understood that our method for promoting the release of the resins from mold surfaces is applicable to other similar thermosetting materials which are highly active in the early portion of their curing cycle.

Embodiment #1

The release is accomplished in our invention in a first preferred embodiment thereof by selecting a wax, the melting point of which is about 185° F. We have used successfully a wax of the Roger Reed Company of Reading, Massachusetts, sold under the trade name of WO-20. The mold employed is provided with a steam or water jacket and, by introducing steam therein, the mold is brought to a temperature of approximately 212° F., at which temperature the wax may be sprinkled onto the mold surface in powdered form or in liquid form in a solvent (such as perchlorethylene, mineral spirits or other chlorinated safety solvents) and distributed across the mold surface to form a continuous unbroken film of wax at or near its fusion point. Thereafter water at a temperature of approximately 135° F. is introduced into the mold jacket and the mold is ready for the initial stages of the resin cure. At this point the charge of unreacted resin materials is introduced into the mold and the mold is closed. As the resin then reacts and cures, the temperature of the mold increases gradually due to the exotherm to a point somewhere around 180° F. Throughout this initial period of the reaction, the wax film remains completely impervious and although the polyurethane materials are extremely active at this time, they are incapable of penetrating the wax to reach the molding surface proper. Once the resin has reached the partially cured state, it is then possible to elevate the temperature of the mold to accelerate the cure without running any substantial risk of having the resin adhere to the mold. At this time steam is introduced into the mold jacket, bringing the mold to 212° F., the wax on the mold surface softens or melts, and the resin continues to cure. Since the resin is no longer extremely active, it does not tend strongly to adhere to the mold surface even though the release agent is softened.

Embodiment #2

A second preferred embodiment of our invention comprises a slight variation from the method just described. In the second embodiment, we employ a wax, the melting temperature of which is slightly higher than 212° F. In this embodiment we have successfully employed a product called Permamold sold by Brulin & Co. of Indianapolis, Indiana. We apply it together with a solvent (as above described), which temporarily reduces its fusion point to about or below 212° F. as long as the solvent is present. In this way an impervious film of wax may be applied to the mold surface at 212° F. with the solvent present, but if permitted to remain at that temperature for a short time, the solvent evaporates and the wax hardens. Thereafter when polyurethane or other similar highly active thermosetting resins are cured in the mold, the wax does not actually melt during the final curing stages but remains in the mold. At the final curing temperature, however, it is softened, and it is actually removed and/or renewed by a fresh application without the need of increasing the mold temperature.

Although the second embodiment differs from the first embodiment described in respect to the time when the wax film is melted and removed after the final curing stage, in both embodiments, after the article has been molded, the wax film surface must be replaced periodically during continuous molding operations. Thus in Embodiment #1 the wax film is automatically removed at the end of each curing cycle, whereas in Embodiment #2 after the curing cycle is complete, the article is removed and then a fresh coating of wax containing the solvent is applied to the mold surface. When this is done the new coating of wax and solvent lifts the old coating at the temperature of 212° F. If this removal and replenishment step is not carried out regularly, small clusters of urethane particles remain embedded in the wax on the mold surface which, by providing small anchor points for subsequently molded materials, interfere with release.

While we have disclosed herein the use of wax, it will be understood that other similar thermoplastic film forming materials will be useful provided they form a film which is complete and impervious to the passage of the urethane reaction products and have a fusion point at or near the final curing temperature of the resin. Thus certain forms of low melting point polyethylene, vinyl resins or the like are suitable. Also while we have referred both to the melting point and the fusion point of the release material, we intend to convey by these terms the concept of a temperature at which these materials will fuse and spread to form a substantially thick and impervious film. This is particularly important when the wax is suspended in a solvent because the wax must be at or near its fusion point as the solvent evaporates or else the wax film will be slightly porous and susceptible to sticking.

Since numerous minor variations of the preferred embodiment of our invention will now become apparent to those skilled in the art, it is not our intention to confine this invention to the precise form herein shown, but rather to limit it in terms of the appended claims.

Having thus described and disclosed preferred embodiments of our invention, what we claim as new and desire to secure by Letters Patent of the United States is:

1. A method for molding articles from thermo-setting resins which resins during curing are initially extremely active and adherent to mold surfaces, but become progressively less active and non-adherent as the cure progresses; said method including the steps of: determining the preferred temperature range for the cure of said resin; selecting a thermoplastic film forming material with a fusion point substantially within said range; applying a continuous film of said thermoplastic material to the surface of a mold; introducing said resin in the uncured state into said mold with the temperature of said mold being at a first temperature within said range but below the melting point of said thermoplastic material; maintaining said mold at a temperature below said fusion point until said resin has partially cured and de-activated sufficiently not to adhere to said mold; thereafter elevating the temperature of said mold to a second temperature within said range but at least as high as the fusion point of said thermoplastic material; whereby the cure is accelerated and said thermoplastic material is melted; maintaining said mold at said second temperature until said cure is substantially complete; and withdrawing said cured resin from said mold while maintaining said second temperature.

2. A method for molding padded elements comprising the steps of mixing for one step curing polyurethane foam ingredients having an initial curing temperature of about 212° F. and a final curing temperature of about 212° F., preparing a mold by elevating its temperature to 212° F. and applying thereto a thermoplastic film forming material which spreads and forms an impervious film at said temperature; reducing the temperature of said mold to about 135° F.; introducing into said mold a charge of said urethane ingredients; maintaining the temperature of said mold substantially below 212° F. until a substantial portion of said urethane ingredients are substantially cured; and thereafter completing the cure of said resin, removing the molded article from said mold while maintaining said mold at a temperature near the fusion point of said thermoplastic film forming material to maintain the same in a substantially softened state and replacing said impervious film all at approximately 212° F.

3. The method of claim 1 wherein said resin is a one-shot foamable urethane mixture.

4. The method of claim 1 wherein said thermoplastic film forming material is a wax having a melting point of 185° F.

References Cited in the file of this patent

UNITED STATES PATENTS

| | | |
|---|---|---|
| 1,809,445 | Henck et al. | June 9, 1931 |
| 2,227,809 | Greenup et al. | Jan. 7, 1941 |
| 2,764,565 | Hoppe et al. | Sept. 25, 1956 |
| 2,804,653 | Talalay | Sept. 3, 1957 |
| 2,851,330 | Taylor | Sept. 9, 1958 |
| 2,879,196 | Brucker | Mar. 24, 1959 |
| 3,006,033 | Knox | Oct. 31, 1961 |

FOREIGN PATENTS

| | | |
|---|---|---|
| 165,413 | Australia | Sept. 28, 1953 |